United States Patent
Lee et al.

(10) Patent No.: US 7,138,352 B2
(45) Date of Patent: Nov. 21, 2006

(54) DIELECTRIC MATERIAL AND THE METHOD OF PREPARING THE SAME

(75) Inventors: Wen-Hsi Lee, Kaohsiung (TW); Che-Yi Su, Kaohsiung (TW); Yi-Feng Yang, Kang-Shan Town (TW)

(73) Assignee: Yageo Corporation, Kaohsiung (TW)

( * ) Notice: Subject to any disclaimer, the term of this patent is extended or adjusted under 35 U.S.C. 154(b) by 93 days.

(21) Appl. No.: 11/040,948

(22) Filed: Jan. 21, 2005

(65) Prior Publication Data
US 2006/0079391 A1 Apr. 13, 2006

(30) Foreign Application Priority Data
Oct. 5, 2004 (TW) .............................. 93130166 A

(51) Int. Cl.
*C04B 35/462* (2006.01)
*C04B 35/465* (2006.01)

(52) U.S. Cl. ...................... 501/136; 428/701; 428/702; 361/321.4

(58) Field of Classification Search ................. 501/136; 428/701, 702; 361/321.4
See application file for complete search history.

(56) References Cited

U.S. PATENT DOCUMENTS

| | | | |
|---|---|---|---|
| 5,556,818 A | 9/1996 | Kohler | |
| 5,723,395 A | 3/1998 | Suzuki et al. | |
| 5,866,492 A | 2/1999 | Kim et al. | |
| 6,743,744 B1 * | 6/2004 | Kim et al. | ............... 501/134 |
| 6,794,324 B1 * | 9/2004 | Kim et al. | ............... 501/134 |
| 2002/0111261 A1 | 8/2002 | Okuyama et al. | |
| 2003/0125192 A1 | 7/2003 | Moon | |

FOREIGN PATENT DOCUMENTS

| | | |
|---|---|---|
| EP | 0913843 A1 | 5/1999 |
| JP | A 05-325641 | 10/1993 |
| JP | A 06-243725 | 2/1994 |

OTHER PUBLICATIONS

Kim et al, Low-Temperature Sintering and Microwave Dielectric Properties of Zinc Metatitanate-Rutile Mixtures Using Boron, Nov. 1999, J.A. Ceram. Soc., 82[11] 3043-48.
Kim et al, Low-Fired (Zn, Mg)TiO$_3$ Microwave Dielectric, Dec. 1999, J.Am. Ceram. Soc., 82[12] 3476-80.

* cited by examiner

*Primary Examiner*—Karl Group
(74) *Attorney, Agent, or Firm*—Merchant & Gould P.C.

(57) ABSTRACT

The present invention relates to a novel ZnTiO$_3$-based dielectric material, having the composition represented by the formula $(Zn_{1-a}Mg_a)(Ti_{1-b-c}Mn_bD_c)_dO_3$, wherein D is an element having a valence of 5 or above, $0 \leq a \leq 0.5$, $c \leq b \leq 0.1$, $0 < c \leq 0.1$, $1 \leq d \leq 1.5$, which has properties of ultra low sintering temperature, high reliability, and high dielectric strength, and is capable of being applied to produce low capacitance multilayer ceramic capacitor with high quality factor, low ESR, and high insulation resistance. The present invention also relates to a method of preparing such a novel ZnTiO$_3$-based dielectric material.

29 Claims, No Drawings

DIELECTRIC MATERIAL AND THE METHOD OF PREPARING THE SAME

FIELD OF THE INVENTION

The present invention relates to a dielectric material, particularly, to a $ZnTiO_3$-based dielectric material. The present invention also relates to a method of preparing the dielectric material.

DESCRIPTION OF THE RELATED ART

Recently, audio/video equipment, computer devices, communication equipment such as cordless telephone receivers and mobile phones, and transmitters/receivers for satellite communication are having higher frequency, and becoming smaller in size and lighter in weight. Accordingly, there is an increasing demand for manufacturing high frequency multiple chip modules. In electrical circuits for manufacturing said modules, a ceramic dielectric is often applied to by-pass circuits, coupling circuits, resonators and filters, wherein the application of a super low temperature microwave-dielectric material to manufacture low capacitance multilayer ceramic capacitor with high quality factor (Q), low equivalent series resistance (ESR) and high insulation resistance (IR) is particularly important. Said material normally requires low dielectric loss, low equivalent series resistance (ESR), high reliability, high insulation resistance (IR), high mechanical strength, and low expansion coefficient.

Traditionally, noble metals such as gold, platinum and palladium are used to produce internal electrodes and terminal electrodes of a capacitor. Inexpensive materials such as silver, silver alloy, copper, and copper alloy are also used for reducing costs. Especially, silver and silver alloy with low ohmic resistance are widely used. However, since silver has a relative low melting point (about 960° C.), a ceramic material with a low sintering temperature must be used so as to be co-fired with silver for applications.

Under ordinary conditions without any additional sintering flux, to achieve an ideal mechanical strength and dielectric property, dielectric materials must be sintered at a temperature ranging from 1300° C. to 1600° C. Normally, materials such as barium titanites, magnesium titanites and barium perovskites are used. To sinter with silver, there is a demand for the development of materials which can be sintered at about 900° C. For example, a zinc metatitanate-rutile blend containing boron was disclosed in J. Am. Ceram. Soc., 82[11] 3043–48 (1999), a (Zn, Mg)$TiO_3$ compound was disclosed in J. Am. Ceram. Soc., 82[12] 3476–80 (1999), a dielectric material based on (SrCa)$TiO_3$ was disclosed in JP-A No. 243725/1994, a dielectric material based on BaO—$TiO_2$ was disclosed in JP-A No. 325641/1993, a dielectric material based on $TiO_2$—ZnO was disclosed in U.S. Pat. No. 5,723,395, and a dielectric material based on $ZnTiO_3$—ZnO—$TiO_2$ was disclosed in U.S. Pat. No. 5,866,492.

U.S. Pat. No. 5,723,395 discloses that $B_2O_3$ glass or $B_2O_3$-containing vitreous component is added to dielectric $ZnTiO_3$ material system for lowering the sintering temperature of dielectric $ZnTiO_3$ material system from 1100° C. to around 900° C. Moreover, the addition of MnO to increase the insulation resistance of dielectric $ZnTiO_3$ material system is also disclosed. According to the teaching of this patent, the addition of 0.1 to 10% MnO can increase the insulation resistance of dielectric $ZnTiO_3$ material system to up to $10^{11}$ ohm. Although this patent teaches the use of $B_2O_3$-containing vitreous components, such as ZnO—$SiO_2$—$B_2O_3$ and $Bi_2O_3$—ZnO—$B_2O_3$, it does not appreciate the importance of the amount of ZnO in the $B_2O_3$-containing vitreous component or the effect of the proportions of $B_2O_3$ and ZnO to the characteristic of material.

U.S. Pat. No. 5,866,492 discloses that Mg (normally MgO) was added for improving the quality factor of dielectric $ZnTiO_3$ material system and raising the phase decomposition temperature of conversion of $ZnTiO_3$ into $Zn_2TiO_4$, wherein the preferred amount of MgO is 0.02 mol to 0.5 mol. However, the sintering temperature of dielectric material provided in this patent reaches 1050 to 1250° C., which is very high and does not satisfy the requirement of co-firing with silver at a low temperature (about 900° C.).

It is found that the use of boron oxide ($B_2O_3$), boron glass or boron-containing glass in $ZnTiO_3$ dielectric material systems causes the problems of unstable sintering characteristic and uncontrollable dielectric properties of the product. The inventors of the present application found that if $B_2O_3$ glass is added directly to the dielectric $ZnTiO_3$ material system disclosed in U.S. Pat. No. 5,723,395, the proportion of Zn/Ti in $ZnTiO_3$ will change and accordingly the dielectric properties will change because $B_2O_3$ must react with ZnO first to produce $B_2O_3$—ZnO to have auxiliary sintering property. Since the melting point of $B_2O_3$ is about 460° C., part of $B_2O_3$ will evaporate when being heated at such a temperature so that the amount of $B_2O_3$ at final auxiliary sintering is not easy to control, resulting in unstable sintering characteristic. Further, when $B_2O_3$-containing vitreous component is added, compositions with a high amount of ZnO will directly affect the proportion of Zn/Ti in the main component of the material, and compositions with a low amount of ZnO will make too much $B_2O_3$ of $B_2O_3$-containing vitreous component react with zinc contained in the main component of the material, which also affects the proportion of Zn/Ti in the main component of the material, thus changing the dielectric properties.

Moreover, the main development trend of multilayer ceramic capacitor is towards high capacity, which is achieved by lowering the thickness of each dielectric layer and the amount of the stacked layers. The thinner the dielectric layer(s) become, the more critical the reliability of the multilayer ceramic capacitor under high temperature and high pressure becomes. Although the dielectric $ZnTiO_3$ material system that can be co-fired with silver has been developed, it cannot meet the requirements of thinning of layers and high capacity due to its low insulation resistance under high temperature and high pressure.

Consequently, the present invention provides a novel material system that improves the properties of a conventional dielectric $ZnTiO_3$ material system in order to achieve a composition with excellent properties, such as stable dielectric properties, high reliability, low sintering temperature, high insulation resistance and high phase decomposition temperature.

SUMMARY OF THE INVENTION

The objective of the present invention is to provide a dielectric material comprising the composition represented by formula (I):

$$(Zn_{1-a}Mg_a)(Ti_{1-b-c}Mn_bD_c)_dO_3 \qquad (I)$$

wherein D is an element having a valence of 5 or above, $0 \leq a \leq 0.5$, $c \leq b \leq 0.1$, $0 < c \leq 0.1$, $1 \leq d \leq 1.5$, which has excellent properties such as high quality factor, ultra low sintering temperature, stable proportion of ceramic component, stable dielectric properties, high phase decomposition temperature, high insulation resistance and high breakdown voltage.

The present invention also relates to a method of preparing the ZnTiO$_3$-based dielectric material represented by the above-mentioned formula (I).

DETAILED DESCRIPTION OF THE INVENTION

The present invention relates to a dielectric material comprising the composition represented by formula (I):

(I)

wherein D is an element having a valence of 5 or above, $0 \leq a \leq 0.5$, $c \leq b \leq 0.1$, $0 < c \leq 0.1$, $1 \leq d \leq 1.5$, preferably $0 \leq a < 0.5$, $0.02 < b \leq 0.1$, $0.005 < c < 0.1$, $1 < d \leq 1.5$.

In the present invention, Zn of conventional dielectric ZnTiO$_3$ material systems is replaced by MgO, which results that the phase decomposition temperature of the dielectric material is higher than its sintering temperature, and thus facilitates the maintenance of its excellent microwave-dielectric properties. Additionally, Ti of conventional dielectric ZnTiO$_3$ material systems is replaced by MnO, which can significantly raise insulation resistance and thus facilitate the manufacture of multilayer ceramic capacitor.

The D element in formula (I) is an element having the valence of 5 or above, preferably a metal element having the valence of 5, more preferably an element of VA or VIA group in the periodic table, most preferably niobium (Nb), tungsten (W) or molybdenum (Mo). The addition of the D element can raise quality factor, reliability and breakdown voltage. It is to be noted that the D element in formula (I) has a valence of 5 or above. However, it may not have a valence of 5 at the beginning step (i.e., adding step) during the preparing procedure. For example, in one embodiment, Nb$_2$O$_4$ is added in adding step. Although Nb has a valence of 4 in this step, it meets the requirement of formula (I) if it is oxidized to have a valence of 5 during the following sintering step.

In order to lower the sintering temperature, a sintering flux may be added during the sintering step of the present invention to lower the sintering temperature of the dielectric material to below 950° C. so that the dielectric material can be co-fired with the electrode made of pure silver during the manufacture of multilayer ceramic element (for example, multilayer ceramic capacitor). In one embodiment, the amount of the sintering flux is e weight % based on the weight of $(Zn_{1-a}Mg_a)(Ti_{1-b-c}Mn_bD_c)_dO_3$, wherein $0 < e \leq 10$, preferably $3 < e < 10$. The sintering flux may be boron oxide or zinc-boron (Zn—B) compound, preferably B$_2$O$_3$ or [(ZnO)$_4$·B$_2$O$_3$], more preferably [(ZnO)$_4$·B$_2$O$_3$].

The present invention also relates to a method of preparing the ZnTiO$_3$-based dielectric material comprising the composition represented by the formula (I):

(I)

wherein D is an element having the valence of 5 or above, $0 \leq a \leq 0.5$, $c \leq b \leq 0.1$, $0 < c \leq 0.1$, $1 \leq d \leq 1.5$. A conventional method of manufacturing a ceramic dielectric material can be used to produce the dielectric material. Further, a sintering flux may be added into the dielectric material so that the dielectric material can be co-fired with electrodes made of pure silver at a temperature below 950° C. In general, the method of preparing a dielectric material of the present invention comprises the following steps:

(a) providing a raw material including a zinc-containing compound, magnesium-containing compound, a titanium-containing compound, manganese-containing compound and a D element-containing compound, wherein the initial amounts of the compounds in the raw material are determined by formula (I):

(I)

wherein D is an element having a valence of 5 or above, $0 \leq a \leq 0.5$, $c \leq b \leq 0.1$, $0 < c \leq 0.1$, $1 \leq d \leq 1.5$, preferably $0 \leq a < 0.5$, $0.02 < b \leq 0.1$, $0.005 < c < 0.1$, $1 < d \leq 1.5$.

(b) mixing and milling the raw material of step (a) in water to form a mixture; and (c) drying the mixture of step (b), and then calcining the dry mixture to produce the dielectric material.

In step (a), the raw material includes the compounds that contain desired metallic species such as oxides and carbonates. Preferably, the zinc-containing compound is zinc oxides (for example, ZnO), the magnesium-containing compound is magnesium oxides (for example, MgO), the titanium-containing compound is titanium oxides (for example, TiO$_2$) and the manganese-containing compound is manganese oxide (for example, MnO). The D element is an element having a valence of 5 or above, preferably a metal element having the valence of 5, more preferably is a element of VA or VIA group in the periodic table, most preferably is niobium (Nb), tungsten (W) or molybdenum (Mo). For example, the D-containing compound is preferably Nb$_2$O$_5$, WO$_3$ or Mo$_2$O$_5$.

In step (b), the raw material is mixed in deionized water to form a mixture that is subsequently milled. In one embodiment, the milling time is preferably more than 3 hours, more preferably about 5 hours.

In step (c), the mixture derived from step (b) is dried and then calcined. In one embodiment, the mixture is pulvarized during calcining at a temperature below 1200° C., preferably between 1000 to 1250° C., more preferably about 1150° C., for 1 to 3 hours, preferably about 2 hours, to produce the dielectric material.

The dielectric material of the present invention can be mixed with an appropriate amount of an organic bonding agent (e.g., polyvinyl acetate (PVA)), a plasticizer (e.g., polyethylene glycol (PEG)), a dispersing agent and a wetting agent to produce a dielectric material paste that can be sintered at a low temperature, e.g., 900° C., to produce a ceramic body.

In order to lower the sintering temperature, a sintering flux may be added into the dielectric material. The amount of the sintering flux is e weight % based on the weight of $(Zn_{1-a}Mg_a)(Ti_{1-b-c}Mn_bD_c)_dO_3$, wherein $0 < e \leq 10$. The sintering flux is used for lowering the sintering temperature of the dielectric material to below 950° C so that the dielectric material can be co-fired with an electrode made of pure silver during the manufacture of a multilayer ceramic capacitor. In one embodiment, the sintering flux is a zinc-boron (Zn—B) compound (for example, [(ZnO)$_4$·B$_2$O$_3$]).

Particularly, the dielectric material of the present invention can be co-fired with conductor materials such as silver, silver alloy, copper and copper alloy to produce multilayer ceramic capacitors, temperature compensating capacitors, capacitor devices of LC filters and dielectric filters. Said multilayer ceramic capacitor with low capacity comprises ceramic material portion, internal electrode and terminal electrode connected to the internal electrode. The dielectric material of the invention is applied to the ceramic material portion. The dielectric material paste derived from the present invention is scraped to form a ceramic film having a thickness of 20 to 30 μm, to which a conductive metallic paste of silver, silver alloy, copper and/or copper alloy is applied by a screen printing technology to form the internal electrode. After being dried, the coated ceramic films are stacked, then several uncoated ceramic films are stacked on the upper and lower sides of said coated ceramic films to form a ceramic body having a ceramic material portion and an internal electrode. The ceramic body is then hot pressed, cut, and sintered at about 900° C. for about 1 hour. The metallic paste of silver, silver alloy, copper and/or copper alloy is dip-galvanized on the two ends of the ceramic body to form terminal electrodes.

With reference to the accompanying examples, the present invention will now be illustrated in detail; however, the scope of the present invention is not confined to the examples.

EXAMPLES

Examples 1 to 24

The raw materials including ZnO, MgO, $TiO_2$, MnO and $N_2O_5$ and optional sintering flux of $B_2O_3$ are provided according to the appropriate values of a, b, c, d and e given in Table 1. First, the ZnO, MgO, $TiO_2$, MnO and $N_2O_5$ were mixed in deionized water and milled for 5 hours in a ball mill with zirconium oxide ball of 2 mm to provide a mixed raw powder of mean particle size of about 0.3 to 0.4 μm. The mixed powder was then dried at 100° C. in the oven, calcined at 1150° C. for 2 hours and milled in water with zirconium oxide ball of 2 mm to provide a ceramic powder of mean particle size of about 0.5 g μm. Then, the ceramic powder was mixed with $[(ZnO)_4 \cdot B_2O_3]$ in e ratio of Table 1 (if e is not zero) to produce a dielectric material powder.

Appropriate amounts of polyvinyl acetate (PVA), polyethylene glycol (PEG), dispersing agents and wetting agents were added to said dielectric material powder to produce a dielectric material paste, which was subsequently sintered at 900° C. for 2 hours to produce a ceramic body. The relative ceramic density (D, g/cm³), dielectric constant (K), loss factor (tan δ), insulation resistance (I.R., ohm), temperature coefficient ($T_{cc}$, ppm/° C.) and highly accelerated life testing (HALT, hrs) were measured and the results are shown in Table 1.

TABLE 1

| Example No. | Mole a | b | c | d | wt % e | (%) Relative density | k | E-4 tan δ | ohm IR | ppm/° C. Tcc | (hrs) HALT |
|---|---|---|---|---|---|---|---|---|---|---|---|
| 1 | 0 | 0.025 | 0.01 | 1.3 | 1 | 97 | 35.0 | 5 | 1.0E+12 | 40 | 100 |
| 2 | 0.1 | 0.025 | 0.01 | 1.3 | 1 | 97 | 32.0 | 3 | 1.0E+12 | 10 | 100 |
| 3 | 0.3 | 0.025 | 0.01 | 1.3 | 1 | 96 | 30.0 | 1 | 1.0E+12 | 3 | 100 |
| 4 | 0.5 | 0.025 | 0.01 | 1.3 | 1 | 88 | 27.0 | 50 | 1.0E+09 | — | — |
| 5 | 0.3 | 0 | 0.01 | 1.3 | 1 | 96 | 30.0 | 5 | 1.0E+11 | 15 | 0.1 |
| 6 | 0.3 | 0.015 | 0.01 | 1.3 | 1 | 96 | 30.0 | 3 | 1.0E+12 | 10 | 10 |
| 7 | 0.3 | 0.02 | 0.01 | 1.3 | 1 | 96 | 30.0 | 1 | 1.0E+12 | 3 | 30 |
| 8 | 0.3 | 0 | 0.02 | 1.3 | 1 | 96 | 31.0 | 1 | 1.0E+11 | 15 | 0.1 |
| 9 | 0.3 | 0.01 | 0.02 | 1.3 | 1 | 96 | 31.0 | 1 | 1.0E+12 | 10 | 10 |
| 10 | 0.3 | 0.02 | 0.02 | 1.3 | 1 | 96 | 31.0 | 2 | 1.0E+12 | 10 | 20 |
| 11 | 0.3 | 0.03 | 0.02 | 1.3 | 1 | 96 | 31.0 | 3 | 1.0E+12 | 10 | 30 |
| 12 | 0.3 | 0.05 | 0.02 | 1.3 | 1 | 93 | 30.5 | 5 | 5.0E+11 | 10 | 100 |
| 13 | 0.3 | 0.1 | 0.02 | 1.3 | 1 | 90 | 30.0 | 10 | 5.0E+10 | 10 | 20 |
| 14 | 0.3 | 0.025 | 0 | 1.3 | 1 | 96 | 29.5 | 3 | 1.0E+12 | −4 | 10 |
| 15 | 0.3 | 0.025 | 0.03 | 1.3 | 1 | 96 | 32.0 | 1 | 1.0E+12 | 17 | 100 |
| 16 | 0.3 | 0.025 | 0.05 | 1.3 | 1 | 96 | 32.0 | 1 | 1.0E+12 | 30 | 30 |
| 17 | 0.3 | 0.025 | 0.1 | 1.3 | 1 | 96 | 35.5 | 1 | 1.0E+12 | 70 | 0.1 |
| 18 | 0.3 | 0.025 | 0.01 | 1.0 | 1 | 96 | 22.0 | 1 | 1.0E+12 | −100 | 100 |
| 19 | 0.3 | 0.025 | 0.01 | 1.1 | 1 | 96 | 36.0 | 1 | 1.0E+12 | −70 | 100 |
| 20 | 0.3 | 0.025 | 0.01 | 1.2 | 1 | 96 | 27.0 | 1 | 1.0E+12 | −30 | 100 |
| 21 | 0.3 | 0.025 | 0.01 | 1.3 | 0 | 80 | — | — | — | — | — |
| 22 | 0.3 | 0.025 | 0.01 | 1.3 | 0.5 | 93 | 30.5 | 3 | 5.0E+11 | −4 | 100 |
| 23 | 0.3 | 0.025 | 0.01 | 1.3 | 5 | 95 | 28.0 | 8 | 1.0E+12 | 60 | 50 |
| 24 | 0.3 | 0.025 | 0.01 | 1.3 | 10 | 97 | 26.0 | 15 | 1.0E+12 | 130 | 20 |

Examples 1 to 4 show the effect of different amounts of Zn and Mg in sample materials on the electric characteristics. The dielectric constant decreases with the increase of the amount of Mg. However, over high amount of Mg (for example, Example 4) influences the sintering of the powder and has a negative effect on the electric characteristics, such as relative high loss factor and relative low insulation resistance. Additionally, the results also show that the loss factor and the temperature coefficient are minimum when a is about 0.3.

Examples 5 to 7 show the effect of different amounts of Mn in sample materials on the electric characteristics when c is 0.01. The results show that the highly accelerated life testing, only 0.1 hour, is not ideal, when Mn is not added (Example 5). The result of highly accelerated life testing becomes better when the addition amount of Mn is increased.

Examples 8 to 13 show the effect of different amounts of Mn in sample materials on the electric characteristics when c is 0.02. The results show that the highly accelerated life testing, only 0.1 hour, is not ideal, when Mn is not added (Example 8). The result of highly accelerated life testing gets better when the addition amount of Mn is increased. However, over high amount of Mn (for example, Example 13) has a negative effect on the electric characteristics because it lowers the result of highly accelerated life testing.

Examples 14 to 17 show the effect of different amounts of Nb in sample materials on the electric characteristics. The dielectric constant and the result of highly accelerated life testing increase with the increase of the amount of Nb. However, the result of highly accelerated life testing will decrease when the amount of Nb is more than that of Mn, that is, c>b, as shown in Example 16 and 17.

Examples 18 to 20 show the effect of different ratios of (Zn+Mg) to (Ti+Mn+Nb) of sample materials on the electric characteristics. The results show that the temperature coefficient can be adjusted to approach to zero by appropriate ratio of (Zn+Mg) to (Ti+Mn+Nb).

Examples 21 to 24 show the effect of different amounts of $B_2O_3$ in sample materials on the electric characteristics. The results show that the ceramic body cannot be sintered when $B_2O_3$ is not added, for example, Example 21, and therefore there is no measured data in Example 21 of Table 1. However, an over high amount of $B_2O_3$ increases the temperature coefficient and lowers the result of highly accelerated life testing.

While several embodiments of this invention have been illustrated and described, various modifications and improvements can be made by those skilled in the art. The embodiments of this invention are therefore described in an illustrative but not restrictive sense. It is intended that this invention may not be limited to the particular forms as illustrated, and that all modifications that maintain the spirit and scope of this invention are within the scope as defined in the appended claims.

What is claimed is:

1. A dielectric material comprising the composition represented by the formula (I):

$$(Zn_{1-a}Mg_a)(Ti_{1-b-c}Mn_bD_c)_dO_3 \qquad (I)$$

wherein D is an element having a valence of 5 or above, $0 \leq a \leq 0.5$, $c \leq b \leq 0.1$, $0 < c \leq 0.1$, $1 \leq d \leq 1.5$.

2. The dielectric material according to claim 1, further comprising a sintering flux in an amount of e weight % based on the weight of $(Zn_{1-a}Mg_a)(Ti_{1-b-c}Mn_bD_c)_dO_3$, wherein $0 < e \leq 10$.

3. The dielectric material according to claim 2, wherein the sintering flux is a boron oxide.

4. The dielectric material according to claim 3, wherein the boron oxide is $B_2O_3$.

5. The dielectric material according to claim 2, wherein the sintering flux is a zinc-boron (Zn—B) compound.

6. The dielectric material according to claim 5, wherein the zinc-boron compound is $[(ZnO)_4 \cdot B_2O_3]$.

7. The dielectric material according to claim 1, wherein D is selected from the group consisting of niobium (Nb), tungsten (W) and molybdenum (Mo).

8. The dielectric material according to claim 1, wherein $0 \leq a < 0.5$.

9. The dielectric material according to claim 1, wherein $0.02 < b \leq 0.1$.

10. The dielectric material according to claim 1, wherein $0.005 < c < 0.1$.

11. The dielectric material according to claim 1, wherein $1 < d \leq 1.5$.

12. The dielectric material according to claim 2, wherein $3 < e < 10$.

13. A multilayer ceramic element comprising the dielectric material according to claim 1.

14. The multilayer ceramic element according to claim 13, wherein the multilayer ceramic element is a multilayer ceramic capacitor having at least one electrode made of silver, silver alloy, copper or copper alloy.

15. A method of preparing a dielectric material comprising:
(a) providing a raw material including a zinc-containing compound, magnesium-containing compound, a titanium-containing compound, manganese-containing compound and a D element-containing compound, wherein the initial amounts of the compounds in the raw material are determined by the formula (I):

$$(Zn_{1-a}Mg_a)(Ti_{1-b-c}Mn_bD_c)_dO_3 \qquad (I)$$

wherein D is an element having a valence of 5 or above, $0 \leq a \leq 0.5$, $c \leq b \leq 0.1$, $0 < c \leq 0.1$, $1 \leq d \leq 1.5$;
(b) mixing and milling the raw material of step (a) in water to form a mixture; and
(c) drying the mixture of step (b), and then calcining the dry mixture to produce the dielectric material.

16. The method according to claim 15, wherein the step (c) is drying the mixture of step (b), and then calcining the dry mixture at 1000 to 1250° C. for 1 to 3 hours.

17. The method according to claim 15, further comprising a step of adding a sintering flux in an amount of e weight % based on the weight of $(Zn_{1-a}Mg_a)(Ti_{1-b-c}Mn_bD_c)_dO_3$, wherein $0 < e \leq 10$.

18. The method according to claim 17, wherein the sintering flux is a boron oxide.

19. The method according to claim 18, wherein the boron oxide is $B_2O_3$.

20. The method according to claim 17, wherein the sintering flux is a zinc-boron (Zn—B) compound.

21. The method according to claim 20, wherein the zinc-boron compound is $[(ZnO)_4 \cdot B_2O_3]$.

22. The method according to claim 15, wherein the zinc-containing compound is ZnO, the magnesium-containing compound is MgO, the titanium-containing compound is $TiO_2$, and the manganese-containing compound is MnO.

23. The method according to claim 15, wherein D is selected from the group consisting of niobium (Nb), tungsten (W) and molybdenum (Mo).

24. The method according to claim 15, wherein the D element-containing compound is an oxide of D element.

25. A dielectric material comprising the composition represented by the formula (II):

$$(Zn_{1-a}Mg_a)(Ti_{1-b-c}Mn_bD_c)_dO_3 + e \text{ wt \%  } B_2O_3 \qquad (II)$$

wherein the amount of $B_2O_3$ is e weight % based on the weight of $(Zn_{1-a}Mg_a)(Ti_{1-b-c}Mn_bD_c)_dO_3$, D is an element having a valence of 5 or above, $0 \leq a \leq 0.5$, $c \leq b \leq 0.1$, $0 < c \leq 0.1$, $1 \leq d \leq 1.5$, $0 < e \leq 10$.

26. The dielectric material according to claim 25, wherein D element is selected from the group consisting of niobium (Nb), tungsten (W) and molybdenum (Mo).

27. The dielectric material according to claim 25, wherein $0 \leq a < 0.5$, $0.02 < b \leq 0.1$, $0.005 < c < 0.1$, $1 < d \leq 1.5$, $3 < e < 10$.

28. A multilayer ceramic element comprising the dielectric material according to claim 25.

29. The multilayer ceramic element according to claim 28, wherein the multilayer ceramic element is a multilayer ceramic capacitor having at least one electrode made of silver, silver alloy, copper or copper alloy.

* * * * *

UNITED STATES PATENT AND TRADEMARK OFFICE
CERTIFICATE OF CORRECTION

PATENT NO. : 7,138,352 B2  
APPLICATION NO. : 11/040948  
DATED : November 21, 2006  
INVENTOR(S) : Lee et al.

Page 1 of 1

It is certified that error appears in the above-identified patent and that said Letters Patent is hereby corrected as shown below:

Col. 7, line 28, claim 1: "$(Zn_{1-a}Mg_a)(T_{1-b-c}Mn_bD_c)_dO_3$" should read --$(Zn_{1-a}Mg_a)(Ti_{1-b-c}Mn_bD_c)_dO_3$--

Signed and Sealed this

Fifth Day of August, 2008

JON W. DUDAS  
*Director of the United States Patent and Trademark Office*